United States Patent [19]

Redman et al.

[11] 4,077,446
[45] Mar. 7, 1978

[54] TREE SHEAR ACTUATOR RESTRAINT SYSTEM

[75] Inventors: Andrew Paul Redman; Gary Lee Schulte, both of Dubuque, Iowa

[73] Assignee: Deere & Company, Moline, Ill.

[21] Appl. No.: 774,763

[22] Filed: Mar. 7, 1977

[51] Int. Cl.² .............................................. A01G 23/08
[52] U.S. Cl. ................................... 144/34 E; 83/600; 92/161; 144/3 D
[58] Field of Search ................... 144/3 D, 34 R, 34 E, 144/309 AC; 83/600; 92/146, 161

[56] References Cited

U.S. PATENT DOCUMENTS

| 2,641,942 | 6/1953 | Mueller | 83/600 X |
| 3,808,909 | 5/1974 | Johnson | 144/34 E |
| 3,826,295 | 7/1974 | Johnson et al. | 144/34 E |

Primary Examiner—Donald R. Schran
Assistant Examiner—W. D. Bray

[57] ABSTRACT

A tree shear head includes a frame which supports a pair of parallel crank shafts which are respectively linked to a pair of shear blades for moving the latter together into the trunk of a tree being sheared. The crank shafts are rotated by means of an actuator including a cylinder in which a pair of piston and piston rod units are mounted with the rods projecting oppositely and being respectively pivotally connected to a pair of crank arms respectively formed integrally with the pair of crank shafts. To prevent the cylinder of the actuator from shifting axially along the piston rods, a pair of links are connected between the cylinder and the frame, and for preventing the cylinder from rotating about the piston rods, a pair of rollers are mounted on the cylinder and engage the frame.

6 Claims, 2 Drawing Figures

TREE SHEAR ACTUATOR RESTRAINT SYSTEM

BACKGROUND OF THE INVENTION

The present invention relates to a restraint system for preventing a cylinder of a hydraulic actuator from shifting endwise on or rotating about piston and rod units in the cylinder while permitting the actuator to undergo certain movements as a unit.

U.S. Pat. No. 3,826,295 granted to Johnson et al. on July 30, 1974 discloses a shear head including a main frame supporting a pair of parallel crankshafts which are respectively linked to a pair of cylindrically curved blades for swinging the latter about an axis located equidistant from the crankshafts. Connected between the crankshafts for effecting rotation thereof is a hydraulic actuator having a cylinder in which a pair of piston and rod units are mounted with the rods projecting oppositely from the cylinder and respectively connected to the crankshafts. Each of the piston and piston rod units is double acting and fluid is routed to and from the cylinder by a plurality of lines that are connected to the cylinder.

This patented actuator arrangement is not entirely satisfactory since unbalanced forces acting inside the cylinder and line flexure, caused when the shear head is adjusted relative to the boom supporting the same, tend to cause the cylinder to shift lengthwise along and/or rotate about the piston and piston rod units resulting in damage to the lines connected to the cylinder.

SUMMARY OF THE INVENTION

According to the present invention there is provided a restraint system for the cylinder of an actuator similar in type and mounting to the shear blade actuator described in the above-described U.S. Pat. No. 3,826,295.

An object of the invention is to provide a restraint system for preventing endwise and rotative movements of the cylinder of an actuator, of the above-described type, while permitting certain unitary movement of the actuator.

Another object of the invention is to provide a cylinder restraint system wherein endwise drifting of the cylinder is prevented by a simple rigid linkage system employing lost-motion connection means for permitting vertical movement of the actuator.

Yet another object is to provide a cylinder restraint system employing a simple arrangement of abutment means which prevent rotation of the cylinder while permitting vertical movement of the actuator.

These and other objects will become apparent from a reading of the ensuing description in conjunction with the appended drawing.

DESCRIPTION OF THE PREFERRED EMBODIMENT

Figure 1:
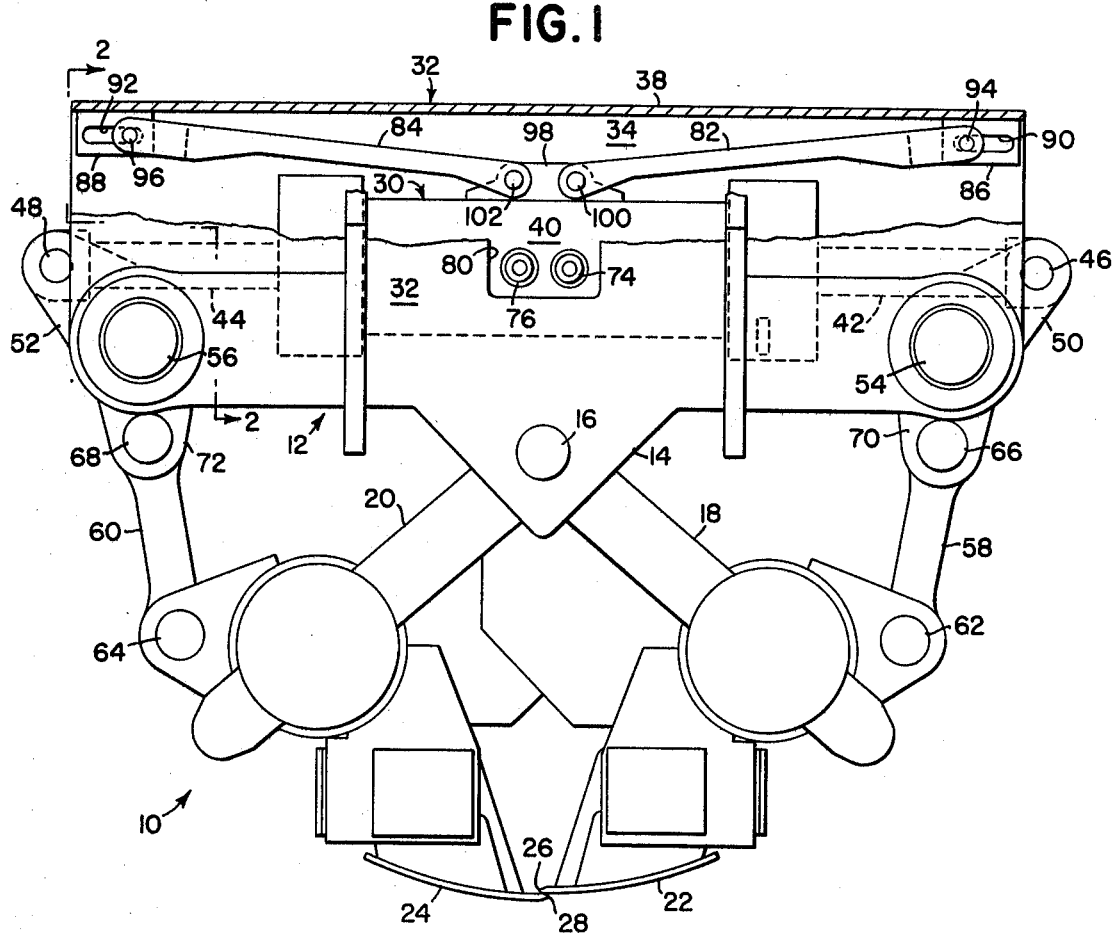
FIG. 1 is a rear elevational view, partly in section, of a tree shear head embodying a cylinder restraint system constructed according to the principles of the present invention.
Figure 2:
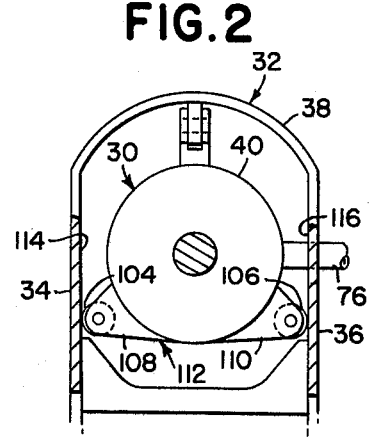
FIG. 2 is a sectional view taken along line 2—2 of FIG. 1 and with parts omitted for clarity and simplicity.

Referring now to FIGS. 1 and 2 of the drawing, therein is shown a shear head 10 including a support frame 12 having a central lower portion 14 in which a horizontal, fore-and-aft extending pivot pin 16 is mounted. Right and left blade support arms 18 and 20, respectively, are vertically pivotally mounted on the pin 16 and right and left cylindrically curved blades 22 and 24 are respectively fixed to lower ends of the arm 18 and 20. The blades 22 and 24 respectively, include fore-and-aft extending cutting edges 26 and 28 and are moveable with the arms 18 and 20 between a closed position, as illustrated, wherein the edges 26 and 28 are overlapped, and an open position (not shown), wherein the edges 26 and 28 are separated from each other so as to permit the head 10 to be positioned adjacent a standing tree with the trunk of the latter located between the blades 22 and 24.

For the purpose of driving the blades 22 and 24 between the open and closed positions, there is provided a hydraulic actuator 30 disposed horizontally in a transverse housing 32 including front and rear upright walls 34 and 36, respectively, joined by a top wall 38. The actuator 30 includes a cylinder 40 having a right and left piston rods 42 and 44 respectively projecting from the right and left ends thereof. The inner ends of the rods 42 and 44 carry respective pistons (not shown) and the outer ends of the rods 42 and 44 are respectively pivotally connected, as at 46 and 48, to a pair of crank arms 50 and 52, which are respectively integrally fixed to right and left drive input crankshafts 54 and 56, respectively, rotatably mounted in the frame 12 adjacent opposite ends of the housing 32 at locations equidistant to the pivot pin 16. Right and left motion transfer links 58 and 60 respectively have lower ends pivotally connected to the arms 18 and 20, at 62 and 64, and have upper ends pivotally connected, at 66 and 68, to right and left drive output crank arms 70 and 72, respectively, fixed integrally with the shafts 54 and 56. It is here noted that the relationship between the actuator 30 and the input crank arms 54 and 56 is such that the pivot connections 46 and 48 will move arcuately upwardly from positions respectively outwardly of the shafts 54 and 56, as shown, through an upper location and then arcuately downwardly to respective positions inwardly of the shafts 54 and 56 when the piston rods 42 and 44 are retracted. The path is retraced, but in reverse, when the rods 42 and 44 are extended to effect closing of the blades 22 and 24. Thus, it will be appreciated that the actuator 30 will rise and fall during each complete stroke of the rods 42 and 44.

For the purpose of conveying working fluid to and exhaust fluid from the cylinder 40, right and left flexible hoses 74 and 76 are coupled to a rear, central location of the cylinder 40. The hoses 74 and 76 project through a rectangular opening 80 provided in the rear wall 36 of the housing 32 and dimensioned to accommodate the vertical movement of the actuator 30.

During shearing of a tree, the force requirement for driving the blades 22 and 24 into a tree may be different resulting in an unbalanced hydraulic force acting on the cylinder 40 such as to force the latter endwise along the piston rods 42 and 44. According to the present invention, such endwise movement is precluded by means right and left rigid restraint links 82 and 84, respectively, coupled between the cylinder 40 and the housing 32. Specifically, fixed to the interior of the top wall 38 of the housing adjacent opposite ends thereof are right and left brackets 86 and 88, respectively. The brackets 86 and 88 are respectively provided with openings 90 and 92 elongated in the direction of the length of the actuator 30 and the outer ends of the links 82 and 84 are coupled to the brackets by pins 94 and 96 received in the openings 90 and 92. A further bracket 98 is fixed to the cylinder 40 at a central top location thereof and the inner ends of the links 82 and 84 are respectively pivotally connected to the bracket 98 by means of pins 100 and 102. The disposition of the pins 94 ad 96 in the openings 90 and 92 is such that upon the cylinder 40 shifting but a small amount leftwardly on the rods 42 and 44 the pin 94 will engage the left end of the opening 90 to preclude further leftward movement. Rightward movement of the cylinder 40 is similarly precluded by the pin 96 engaging the right end of the opening 92. Also, the pins 94 and 96 are disposed in the openings 90 and 92 such that the cylinder 40 may rise and fall freely with the pins 94 and 96 respectively moving outwardly and inwardly in the openings 90 and 92.

During manipulation of the shear head 10 about its pivotal connection (not shown) with the end of a boom on which it is carried, the hoses 74 and 76 may flex and tend to cause the cylinder 40 to rotate about the rods 42 and 44. This rotation is precluded by front and rear rollers 104 and 106 rotatably mounted in front and rear ears 108 and 110 of a bracket 112 fixed to the cylinder 40 at lower locations adjacent the right end thereof, the rollers 104 and 106 being respectively rollingly engaged with vertical inner surfaces 114 and 116 of the front and rear walls 34 and 36. As viewed in FIG. 2, the front roller 104 bears against the front wall 34 so as to prevent clockwise rotation of the cylinder 40 while the rear roller 106 bears against the rear wall 36 so as to prevent counterclockwise rotation. Of course, it is clear that the rollers 104 and 106 will permit the cylinder 40 to freely rise and fall during actuation of the actuator 30.

Thus, it will be appreciated that the restraint links and mountings therefor cooperate with the rollers and mountings therefor to define a simple restraint system which precludes endwise and rotative motion of the cylinder 40.

While applicants have disclosed a pair of links and a pair of rollers as part of their restraint system it will be appreciated that for other shear head configurations, a single link and a single roller or abutment may be used to restrain the cylinder without departing from the inventive concepts disclosed herein.

The operation of this system is thought to be understood from the foregoing description and for the sake of brevity the description of the operation is not reiterated.

We claim:

1. In a tree shear head including a support frame defining a horizontal transverse actuator housing having opposite ends, a pair of horizontal longitudinally extending crankshafts respectively rotatably mounted in the support frame adjacent the opposite ends of the housing and respectively having a pair of crank arms integral therewith, a pair of shear blades mounted on the frame for vertical swinging movement toward and away from each other about a horizontal longitudinal axis located below and equidistant from the crankshafts, a pair of drive links respectively connecting the crankshaft to the pair of shear blades, a hydraulic actuator located in the housing and having a cylinder from the opposite ends of which respectively project a pair of piston rods having respective outer ends connected to the pair of crank arms and having respective inner ends carrying pistons which are each adapted to be slectively pressure-reciprocated in the cylinder for effecting simultaneous extension and retraction of the piston rods and said pair of crank arms being disposed to the crank shafts such that during extension and retraction of the piston rods the cylinder will rise and fall, the improvement comprising: a cylinder restraint means including rigid link means; first and second connection means respectively pivotally connecting the opposite ends of the link means to the cylinder and to the support frame; and at least one of the first and second connection means including lost motion means accommodating endwise movement of the link means due to the rise and fall of the cylinder during operation of the actuator but preventing endwise movement of the cylinder relative to the frame.

2. The tree shear head defined in claim 1 wherein the link means includes first and second links.

3. The tree shear head defined in claim 2 wherein the second connection means includes a pair of brackets respectively fixed to the housing adjacent opposite ends of the latter; each of said brackets being provided with an opening elongated parallel to the length of the actuator and a pivot pin received in each opening and in a respective one of the first and second links.

4. The tree shear head defined in claim 3 wherein the housing extends centrally above the actuator and said pair of brackets being located centrally above the actuator; and said third connection means including a bracket fixed to a central top portion of the cylinders.

5. The tree shear defined in claim 1 wherein said housing includes inner vertical front and rear wall surfaces disposed adjacent to front and rear side portions of the cylinder; abutment means fixed to the cylinder at said side portions and said front and rear wall surfaces such as to move vertically therealong as the actuator rises and falls during operation thereof and such as to prevent the cylinder from rotating about the piston rods.

6. The tree shear defined in claim 1 wherein said abutment means includes first and second rollers rotatably carried by the cylinder for rotation about respective axes extending parallel to the length of the actuator; and said first and second rollers respectively engaging the front and rear wall surfaces.

* * * * *